(12) United States Patent
Chhabra et al.

(10) Patent No.: US 11,537,321 B2
(45) Date of Patent: Dec. 27, 2022

(54) DATA SELECTION BASED ON QUALITY

(71) Applicant: Micron Technology, Inc., Boise, ID (US)

(72) Inventors: Bhumika Chhabra, Boise, ID (US);
Carla L. Christensen, Boise, ID (US);
Zahra Hosseinimakarem, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 73 days.

(21) Appl. No.: 16/928,902

(22) Filed: Jul. 14, 2020

(65) Prior Publication Data
US 2022/0019376 A1 Jan. 20, 2022

(51) Int. Cl.
*G06F 3/06* (2006.01)
*H04N 1/21* (2006.01)
*G06V 10/75* (2022.01)

(52) U.S. Cl.
CPC .......... *G06F 3/0659* (2013.01); *G06F 3/0604* (2013.01); *G06F 3/0679* (2013.01); *G06V 10/751* (2022.01); *H04N 1/2129* (2013.01); *H04N 2201/0084* (2013.01)

(58) Field of Classification Search
CPC .... G06F 3/0659; G06F 3/0604; G06F 3/0679; G06F 3/061; G06F 3/0625; G06F 3/0644; G06F 3/0685; G06K 9/6202; H04N 1/2129; H04N 2201/0084; G06V 10/751; G06V 20/56; Y02D 10/00
See application file for complete search history.

(56) References Cited

U.S. PATENT DOCUMENTS

| 6,297,988 B1 | 10/2001 | Parker et al. |
| 2006/0187310 A1* | 8/2006 | Janson ............... H04N 5/23296 348/218.1 |
| 2008/0126680 A1 | 5/2008 | Lee et al. |
| (Continued) | | |

FOREIGN PATENT DOCUMENTS

WO 2010078044 7/2019

OTHER PUBLICATIONS

International Search Report and Written Opinion from related international application No. PCT/2021/041223, dated Oct. 28, 2021, 12 pages.

*Primary Examiner* — Larry T Mackall
(74) *Attorney, Agent, or Firm* — Brooks, Cameron & Huebsch, PLLC (57) ABSTRACT

Systems, apparatuses, and methods related to media type selection are described. Memory systems can include multiple types of memory media (e.g., volatile and/or non-volatile) and can write data to the memory media types. Data inputs can be written (e.g., stored) in a particular type of memory media based on characteristics (e.g., source, attributes, and/or information etc. included in the data). For instance, selection of a portion of data can be based on the quality of the data received. In an example, a method can include receiving, by a memory system of a mobile device that comprises a plurality of memory media types, data from the assigned image sensor of a plurality of image sensors of the mobile device; and selecting a portion of data from the received data based on one or more characteristics of the data that indicate a quality of an image or images represented by the portion of data.

19 Claims, 5 Drawing Sheets

(56) References Cited

U.S. PATENT DOCUMENTS

| | | | |
|---|---|---|---|
| 2008/0209114 | A1 | 8/2008 | Chow et al. |
| 2010/0045821 | A1* | 2/2010 | Mergler .................. H04N 1/215 |
| | | | 348/231.2 |
| 2011/0268369 | A1* | 11/2011 | Richards .................. G06T 7/97 |
| | | | 382/284 |
| 2014/0229656 | A1 | 8/2014 | Goss et al. |
| 2014/0351505 | A1 | 11/2014 | Chiu |
| 2016/0018990 | A1 | 1/2016 | Yun |
| 2017/0054895 | A1 | 2/2017 | Wan et al. |
| 2019/0050957 | A1 | 2/2019 | Shen et al. |
| 2019/0303038 | A1 | 10/2019 | Hubbard |
| 2020/0235147 | A1* | 7/2020 | Li ..................... H01L 27/14806 |
| 2020/0241805 | A1* | 7/2020 | Armangau ............ G06F 3/0659 |

\* cited by examiner

DATA SELECTION BASED ON QUALITY

TECHNICAL FIELD

The present disclosure relates generally to semiconductor memory and methods, and more particularly, to apparatuses, systems, and methods for media type selection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices can be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to media type selection are described. Memory systems can include multiple types of memory media (e.g., volatile and/or non-volatile) and can write data to the various memory media types. The data inputs that can be written to memory media can vary based on characteristics such as source, attributes, metadata, and/or information included in the data. Data inputs received by a memory system can be written (e.g., stored) in a particular type of memory media based on attributes. For instance, a particular memory media type can be selected from multiple tiers of memory media types based on characteristics of the memory media type and the attributes of the data input. Characteristics of the memory media type can include volatility, non-volatility, power usage, read/write latency, footprint, resource usage, and/or cost. In an example, a method can include receiving, by a memory system of a mobile device that comprises a plurality of memory media types, the data from the assigned image sensor of a plurality of image sensors of the mobile device; and selecting a portion of data from the received data based on one or more characteristics of the data that indicate a quality of an image or images represented by the portion of data.

A computing system including memory systems can include one or more different memory media types which can be used to store (e.g., write) data in a computing system. Such data can be transferred between a host associated with the computing system and the memory system. The data stored in memory media can be important or even critical to operation of the computing system and/or the host. There are various types of memory media and each type of memory media includes characteristics that may be unique to the memory media type.

For example, non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory. Volatile memory can require power to maintain its data (e.g., host data, error data, etc.) and includes random-access memory (RAM), dynamic random access memory (DRAM), and static random access memory (SRAM), among others. The characteristics of different memory media types can include features that cause tradeoffs related to performance, storage density, energy requirements read/write speed, cost, etc. In some examples, some memory media types may be faster to read/write but less cost effective than other memory media types. In other examples, memory media types may be faster but consume a large amount of power and reduce the life of a battery, other memory media types can be slower and consume less power.

As hosts such as mobile devices, semi-autonomous vehicles, fully autonomous vehicles, digital cameras, mobile artificial intelligence systems, etc. become more prevalent, image sensors and other devices related to computing systems and hosts are also increasingly prevalent. The image sensors can produce frequent and/or large quantities of data which can be used by a computing system, a host, and/or a user interface corresponding to a host, to make decisions related to the operation of the host. Balancing the tradeoffs between various different memory media types to store the frequent and/or large quantities of data efficiently can be an important endeavor. Particularly, when large quantities and/or frequent data inputs are generated, they require quick decisions related to an operation of a host device.

In some approaches, data may be written (e.g., stored) to a memory system based on an order in which the data arrives from an origin or by another predetermined schema and is automatically written to a particular memory media type. This approach can cause the retrieval or interpretation of the data to be slow, ineffective, costly, and/or otherwise waste resources of the computing system (e.g., host). As a result, the tradeoffs of a computing system writing data to particular memory media types can become more pronounced. Said differently, writing data according to a predetermined schema can result in non-important data occupying space in a memory media type that is better suited for important (e.g., critical) data, and critical data may be confined to a media type that is slower to access. This can lead to inefficient operation of the host and/or error in retrieving critical data from memory media on the memory system.

As mentioned, host devices can include communicatively coupled devices (e.g., image sensors) which may be intermittently or consistently generating data to be written (e.g., stored) to memory media of a memory system. As storage capability of memory systems increase, and the volume of generated data increases, and the effects of inefficient data storage becomes more pronounced. These effects can be further exacerbated by the limitations of some approaches to read and interpret data such that the contents can be effective, especially as the amount of data stored in memory systems and the speed at which data retrieval is expected.

In contrast, embodiments herein are directed to selecting a portion of data from received data and storing (e.g., writing) the portion of data generated from an host communicatively coupled to a memory system (e.g., image sensors generating data) based on attributes of the data, a context of the host device, information included in the data, information about the data compared to a baseline, or combinations thereof. Selecting a portion of data based on identified information about the portion of data, such as one or more characteristics of the data that indicate a quality of an image or images represented by the portion of data, can determine which portion of data will aid the storage efficiency of the host. Storing (e.g., writing) the portion of data based on attributes can determine an appropriate memory media type to best utilize resources (e.g., power, space, cost, etc.) Using attributes, a rank can be assigned to the data, and the data can be stored in a memory media type based on the rank of the data. For example, in a context of mobile devices and/or digital cameras, decisions related to data received from image sensors may need to be made quickly, and latency in retrieval can be undesirable. In such examples, data requiring quick decisions may be ranked higher and written to a memory media including quick retrieval features (e.g., DRAM). In contrast, data received from an image sensor that is determined not to require a quick decision can be ranked lower and stored in a memory media having a slower retrieval speed (e.g., NAND).

As used herein, the term "attribute" refers to metrics of the data. For example, an attribute of data can refer to the quantity (e.g. size and number) and quality (e.g. clarity) of the data to be stored in the memory media. In other words, an attribute of the data can refer to a characteristic of the data (e.g., how large the portion of data maybe or how many files exist within the portion of data a location on the host or positional information) or contents of the data (e.g., metadata such as time, date, GPS location, etc.), or a context of the host corresponding to the image sensor generating the data (e.g., an image sensor on a mobile device being a certain distance from the object captured within the data). As used herein, the terms "information included in/about the data" and/or "identified information" refers to the quality of the data. The quality of the data may include the size (bytes, pixels, etc.) and the of the image, among other considerations. The information about the data/attribute can be compared to baseline information, and the comparison can be used to determine which portion of data should be considered for storage within a memory media type. The baseline information may be predetermined by a user.

The selection of a memory media type from a multiple memory media types, of which to store the data received, can be made by a memory system controller and/or a host controller. A memory system controller can be a controller or other circuitry which is coupled to the memory system. The memory system controller can include hardware, firmware, and/or software to determine attributes and information about the incoming data and select a memory media type to write the data. A host controller can be a controller or other circuitry which can be communicatively coupled to the memory system to determine attributes and information about the incoming data and select a memory media type to write the data.

Embodiments herein can allow a memory system including multiple memory media types to selectively determine which memory media type is appropriate for the incoming data, based at least in part, on attributes of the data, a context of the host, information included in the data, a comparison of the data to baseline data, or a combination thereof.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "J," "K," "L," "N," "R," "Q," etc., particularly with respect to reference numerals in the drawings, indicate that a number of the particular feature so designation can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 109 can reference element "09" in FIG. 1, and a similar element can be referenced as 209 in FIG. 2. A group or plurality of similar elements or components can generally be referred to herein with a single element number. For example, a plurality of reference elements 230-1, . . . , 230-N (e.g., 230-1 to 230-P) can be referred to generally as 230. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
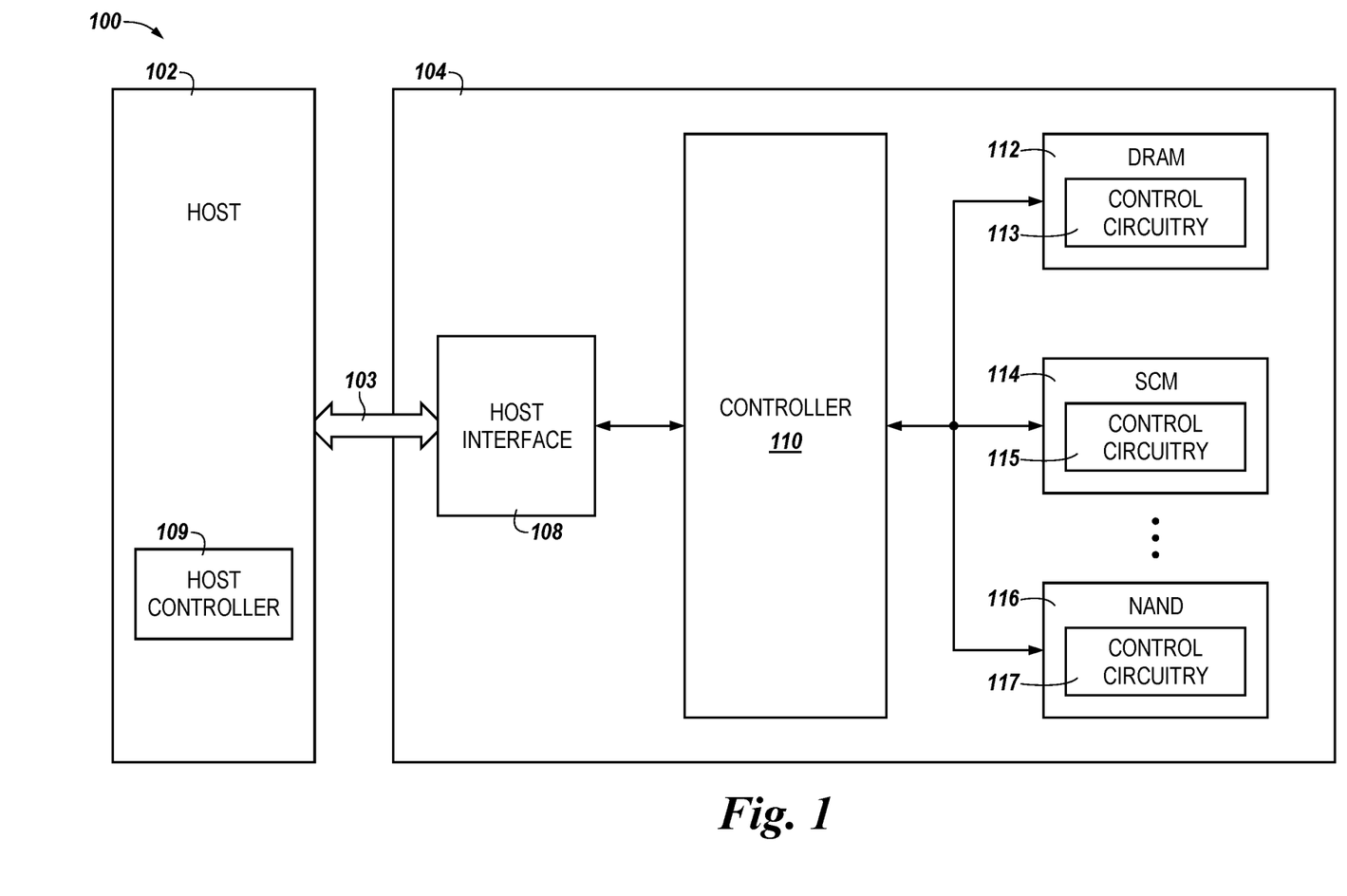
FIG. 1 is a functional block diagram in the form of a computing system including an apparatus including a memory system in accordance with a number of embodiments of the present disclosure.

FIG. 1 is a functional block diagram in the form of a computing system 100 including an apparatus including a memory system 104 in accordance with a number of embodiments of the present disclosure. As used herein, an "apparatus" can refer to, but is not limited to, any of a variety of structures or combinations of structures, such as a circuit or circuitry, a die or dice, a module or modules, a device or devices, or a system or systems, for example. The memory system 104 can include a host interface 108, a controller 110, e.g., a processor, control circuitry, hardware, firmware, and/or software and a number of memory media devices each including control circuitry.

FIG. 1 illustrates a non-limiting example of multiple memory media types in the form of a DRAM 112 including control circuitry 113, SCM 114 including control circuitry 115, and a NAND 116 including control circuitry 117. While three memory media types (e.g., DRAM 112, SCM 114, and NAND 116) are illustrated, embodiments are not so limited, however, and there can be more or less than three memory media types. Further, the types of memory media are not limited to the three specifically illustrated (e.g., DRAM 112, SCM 114, and NAND 116) in FIG. 1, other types of volatile and/or non-volatile memory media types are contemplated. In a number of embodiments, the controller 110, the memory media DRAM 112, SCM, 114, and NAND 116, and/or the host interface 108 can be physically located on a single die or within a single package, e.g., a managed memory application. Also, in a number of embodiments, a memory, e.g., memory media DRAM 112, SCM, 114, and NAND 116, can be included on a single memory system 104.

As illustrated in FIG. 1, the controller 110 can be coupled to the host interface 108 and to the memory media DRAM 112, SCM, 114, and NAND 116 via one or more channels and can be used to transfer data between the memory system 104 and a host 102 having a host controller 109. The host interface 108 can be in the form of a standardized interface. For example, when the memory system 104 is used for data storage in a computing system 100, the interface 108 can be a serial advanced technology attachment (SATA), peripheral component interconnect express (PCIe), or a universal serial bus (USB), a double data rate (DDR) interface, among other connectors and interfaces. In general, however, interface 108 can provide an interface for passing control, address, data, and other signals between the memory system 104 and a host 102 having compatible receptors for the host interface 108.

The host 102 can be a host system such as a personal laptop computer, a vehicle, a desktop computer, a digital camera, a mobile telephone, an internet-of-things (IoT) enabled device, or a memory card reader, graphics processing unit (e.g., a video card), among various other types of hosts. The host 102 can include a system motherboard and/or backplane and can include a number of memory access devices, e.g., a number of processing resources (e.g., one or more processors, microprocessors, or some other type of controlling circuitry). One of ordinary skill in the art will appreciate that "a processor" can intend one or more processors, such as a parallel processing system, a number of coprocessors, etc. The host 102 can be coupled to a host interface 108 of the memory system 104 by a communication channel 103.

As used herein an "IoT enabled device" can refer to devices embedded with electronics, software, image sensors, actuators, and/or network connectivity which enable such devices to connect to a network and/or exchange data. Examples of IoT enabled devices include mobile phones, smart phones, tablets, phablets, computing devices, implantable devices, vehicles, home appliances, digital cameras, smart home devices, monitoring devices, wearable devices, devices enabling intelligent shopping systems, among other cyber-physical systems.

In some embodiments, the host 102 can be responsible for executing an operating system for a computing system 100 that includes the memory system 104. Accordingly, in some embodiments, the host 102 can be responsible for controlling operation of the memory system 104. For example, the host 102 can execute instructions (e.g., in the form of an operating system) that manage the hardware of the computing system 100 such as scheduling tasks, executing applications, controlling peripherals, etc.

The computing system 100 can include separate integrated circuits or the host 102, the memory system 104, the host interface 108, the controller 110, and/or the memory media DRAM 112, SCM, 114, and/or NAND 116 can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

Although not illustrated in FIG. 1 as to not obscure the examples of the disclosure, the memory system 104 can be communicatively coupled (e.g., connected) to image sensors which can be communicatively coupled to the host 102. The term "coupled" means directly or indirectly connected and, unless stated otherwise, can include a wireless connection. As used herein, the term "image sensor" refers to a device that can generate and send data and/or receive data. Some examples of image sensors can include temperature devices, camera devices, video devices, audio devices, motion devices, Internet of Things (IoT) enabled devices (e.g., vehicle electronic control unit (ECU) devices, lens, thermostats, bulbs, locks, security systems, toothbrushes, pet feeders, etc.), among others. The image sensors may transmit data for storage in the memory system 104. For example, the controller 110 can be coupled to a plurality of memory media types (e.g., the memory media DRAM 112, SCM, 114, and NAND 116) to receive data from the plurality of image sensors.

The controller 110 (and/or the host controller 109) can receive data multiple times from an individual image sensor, or from multiple image sensors. The image sensors may have multiple functionalities and transmit a data or data having more than one type of information. For example, one or more of the image sensors can include acoustic (e.g., a microphone, etc.) functionality, video functionality, or both and be communicatively coupled to the host 102. The controller 110 can identify information about one or more attributes of the data. For example, the controller 110 can identify a particular image sensor that transmitted the data, the quality of the data, the contents of the data, an operation of the host 102 at the time the data was transmitted, etc. The controller 110 can select, based at least in part on the identified information about the data, whether to select or discard portion of data and based on one or more attributes of the portion of data, select a memory media type of the plurality of memory media types (e.g., memory media DRAM 112, SCM, 114, and NAND 116) and write the portion of data to the selected memory media type. Further, the memory media types (e.g., memory media DRAM 112, SCM, 114, and NAND 116) can be communicatively coupled to each other such that data can be transferred between the memory media.

The selection of the memory media type can be based in part on a rank assigned to the data by the controller 110. The assigned rank can be based at least in part on the information about the data and/or the one or more attributes within a context of the host. In some examples, the context can be an operation of the host. For example, in some embodiments, the host 102 can be a mobile device and the attributes of the data are related to a size, clarity and number of data received by each of a plurality of image sensors (e.g. lens) respective to the host 102 (e.g., the mobile device) communicatively coupled to the controller 110. For example, the higher data is ranked, the faster it may need to be accessed by the computing system 100.

In one embodiment, data may be sent to the controller 110. The data may be a plurality of images. The controller 110 may identify information about the data. The identified information, such as the quality of the data, may aid the controller 110 in selecting a portion of data of the received data. A portion of data may be a singular portion of the data. Data may also be referred to as a plurality when emphasizing the multiplicity of data being received by the controller 110. Data having better clarity or below a threshold size (e.g. pixels or bytes) may be ranked higher than bulky data or unreadable, unclear data. In some embodiments, the threshold size number and clarity may be predetermined by a user. The higher ranked data may be written into the DRAM 112 because it is faster than other types of memory media. That is, the data with better clarity or below a threshold size may be written into the DRAM 112 because it is faster than the other types of memory media. In some embodiments, higher ranked data may be automatically written into its selected memory media type by the controller 110.

The lower ranked data may be written to the SCM 114 or the NAND 116 because it is not as relevant to the context (e.g., efficient processing) of the host 102 (e.g., the mobile device) and thus ranked lower. That is, the bulky, unclear or distorted data or above a predetermined size (e.g. pixels or bytes) may be written to the SCM 114 or the NAND 116 because it is ranked lower as it not as relevant to the context (e.g., efficient processing) of the host 102 (e.g., the mobile device). In some examples, the controller 110 can compare the received data to reference data related to the image sensor.

For example, the controller 110 may receive data from an image sensor of the plurality of image sensors coupled to the host 102. The controller can select a portion of data of the received data based on identified information. The controller can compare the selected data from the image sensor to reference data (corresponding to the same image sensor) stored by a memory media type (e.g., SCM 114 or NAND 116). The controller 110 can identify differences between the selected received data and the reference data and assign a rank to the selected data based at least in part on the identified differences. An indication of differences in the selected data and the reference data can indicate that the received data should be stored in a memory media type that is quickly accessible (e.g., DRAM 112). In contrast, when no differences between the received data and the reference data are identified, the controller 110 may store the received data in a memory type that is not as quickly accessible.

For example, the controller 110 can write the received data in a first memory media type (e.g., DRAM 112) of the plurality of memory media types (e.g., memory media DRAM 112, SCM, 114, and NAND 116) responsive to the comparison indicating differences between the received data and the reference data. In contrast, the controller 110 can write the received data in a second memory media type (e.g., SCM 114 or NAND 116) of the plurality of memory media types (e.g., memory media DRAM 112, SCM, 114, and NAND 116) responsive to the comparison indicating that the received data and the reference data is the same, where the first memory media type is volatile and can be accessed quickly, and the second memory media type is non-volatile and may be slower to access.

Figure 2:
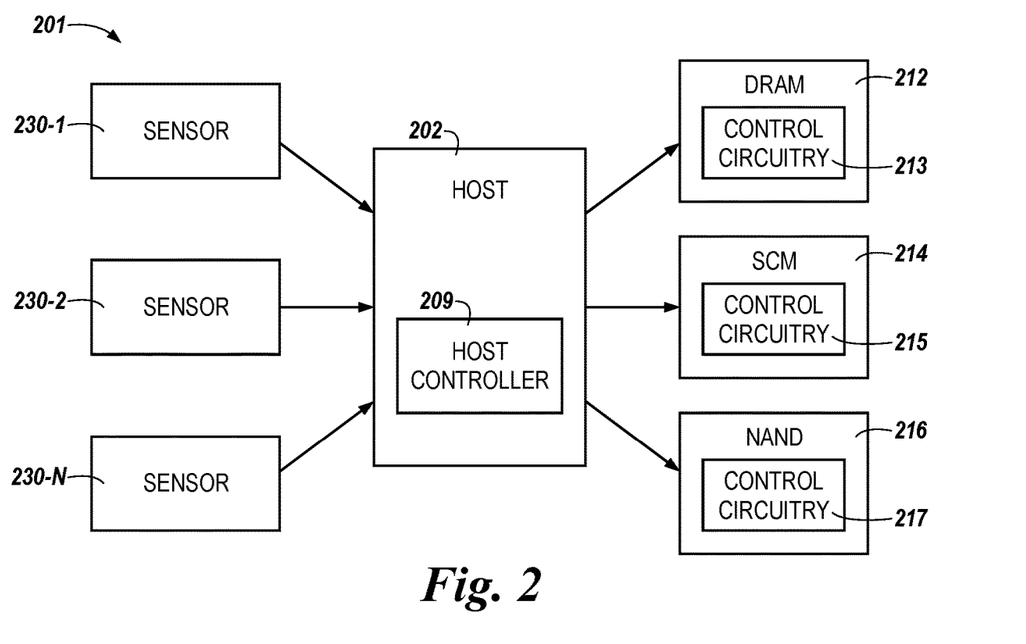
FIG. 2 is a functional block diagram in the form of a computing system including multiple memory media types in accordance with a number of embodiments of the present disclosure.

FIG. 2 is a functional block diagram in the form of a computing system 201 including multiple memory media types in accordance with a number of embodiments of the present disclosure. FIG. 2 illustrates a computing system 201 which includes a host 202, including a host controller 209 which can be analogous to the host 102 and host controller 109 described in connection with FIG. 1. Although not illustrated in FIG. 2 as to not obstruct the examples of the disclosure, computing system 201 can include a controller (e.g., controller 110 described in connection with FIG. 1). The computing system 201 can include image sensors 230-1, 230-2, and 230-N, which may be generally referred to herein as the image sensors 230.

The host 202 can be communicatively coupled to the image sensors 230 via a physical connection (e.g., via wiring, circuitry, etc.) or remotely coupled (e.g., via a wireless signal, near field communication, Bluetooth, Bluetooth Low Energy, RFID, etc.). The host 202 can be communicatively coupled to one or more memory media types. FIG. 2 illustrates a non-limiting example of multiple memory media types in the form of a DRAM 212 including control circuitry 213, SCM 214 including control circuitry 215, and a NAND 216 including control circuitry 217. The host 202 can receive data generated from one or more of the image sensors 230.

The embodiment illustrated in FIG. 2 illustrates an example of the image sensors 230 transmitting data to the host 202 having a host controller 209, where the host controller 209 receives data from one or more of the image sensors 230 and determines a rank of the data received. Based on the determined rank, the host controller 209 can determine which memory media type (e.g., DRAM 212, SCM 214, and/or NAND 216) is the most appropriate to write the data to. Embodiments described in connection with FIG. 2 are not so limited, however, examples described in connection with FIG. 2 can be accomplished with a memory system controller analogous to the controller 110 of FIG. 1.

The host controller 209 can receive data from at least one image sensor of the image sensors 209, identify one more attributes about the data, and select one or more of the memory media types (e.g., DRAM 212, SCM 214, and/or NAND 216) to write the data to, based on the identified attributes. For example, the host controller 209 can receive data from a first image sensor 230-1 of the plurality of image sensors 230 and identify information about one or more attributes of the data from the first image sensor 230-1. Attributes of the data received from the first image sensor 230-1 can be a type of image sensor or a location of the image sensor 230-1 relative to the host 202 (e.g., data received from a camera image sensor). Information about the attributes of the data from the first image sensor 230-1 can include a time received, images captured from the first image sensor 230-1, etc.

The host controller 209 can receive data from any of the image sensors 230 separately or concurrently. For example, the host controller 209 can receive data from a second image sensor 230-2 of the plurality of image sensors 230, separately or concurrent with the data received from the first image sensor 230-1, and identify information about one or more attributes about the data from the second image sensor 230-2. Attributes of the data received from the second image sensor 230-2 can be a type of image sensor or a location of the image sensor 230-2 relative to the host 202 (e.g., data received from a camera image sensor). Information about the attributes can include metrics such as can include a time received, images captured from the second image sensor 230-2, etc. The host controller 209 can determine a rank of the data received from the first image sensor 230-1 and the data received from the second image sensor 230-2.

For example, the host controller 209 can determine, based on the identified information about the one or more attributes from the first image sensor 230-1 and the second image sensor 230-2, a rank of the information corresponding to the first image sensor 230-1 and the second image sensor 230-2. The host controller 209 can determine a memory media type to store the data based at least in part on the rank.

For example, the host controller 209 can select the memory media type (e.g., DRAM 212, SCM 214, and/or NAND 216) to write the data from the first image sensor 230-1 and the second image sensor 230-2, where the memory media type selected depends on the determined rank of the information corresponding to the first image sensor 230-1 and the second image sensor 230-2. Specifically, the host controller 209 can store the data having the higher rank in memory media that has characteristics related to fast accessibility (e.g., DRAM 212) because the higher ranked data is more important to the context of the host 202. In other embodiments, the host controller 209 can receive more than one portion of data from an individual image sensor 230.

The host controller 209 can receive a first portion of data from an image sensor 230-N of the plurality of image sensors 230 and identify information about one or more attributes of the first portion of data from the image sensor 230-N. In this example, the attributes of the image sensor 230-N can be a type and location of the image sensor 230-N relative to the host 202 (e.g., a video image sensor located on a host), and information about the one or more attributes of the data can include such metrics as a time the first portion of data was captured, images included in the first portion of data, etc. The host controller 209 can receive a subsequent portion of data from the image sensor 230-N.

For example, the host controller 209 can receive a subsequent portion of data from the image sensor 230-N and identify information about one or more attributes of the subsequent portion of data from the image sensor 230-N. In this example, the attributes can be the same attributes corresponding to the first portion of data (e.g., a video image sensor located on a host) because the first portion of data and the subsequent portion of data were generated by the same image sensor 230-N. However, the information about the attributes of the subsequent portion of data may be different from the first portion of data. For example, the information of the subsequent portion of data may include images that were captured at a different time, or the host 202 (e.g., the camera) may have changed a context. The host controller 209 can rank the first portion of data and the second portion of data based on the information about the attributes of the image sensor 230-N that generated the data.

Continuing with the previous example, the host controller 209 can determine, based on the identified information about the one or more attributes of the first portion of data and the subsequent portion of data received from the image sensor 230-N, a rank of the first portion of data and the subsequent portion of data. The first portion of data the subsequent portion of data can be the same or different. The host controller 209 can select the memory media type (e.g., DRAM 212, SCM 214, and/or NAND 216) to write the first portion of data and the subsequent portion of data from the image sensor 230-N, where the memory media type selected depends on the determined rank of the information corresponding to the first portion of data and the subsequent portion of data.

For example, the host controller 209 can select a first memory media type DRAM 212 to write a first portion of data received from image sensor 230-N and select a second memory media type SCM 214 to write the subsequent portion of data received from the image sensor 230-N, where the first memory media type DRAM 212 and the second memory media type SCM 214 are different and selected based on a determined rank of the first and the subsequent portions of the data. In other words, the portion of the data that is determined to be the highest ranked (e.g., the most important or most relevant to the host 202) can be stored in a place that is more quickly accessible (e.g., DRAM 212) and the lower ranked (e.g., not relevant or important to the host 202) can be stored in a memory media that is slower to access (e.g., SCM 214 or NAND 216).

Figure 3:
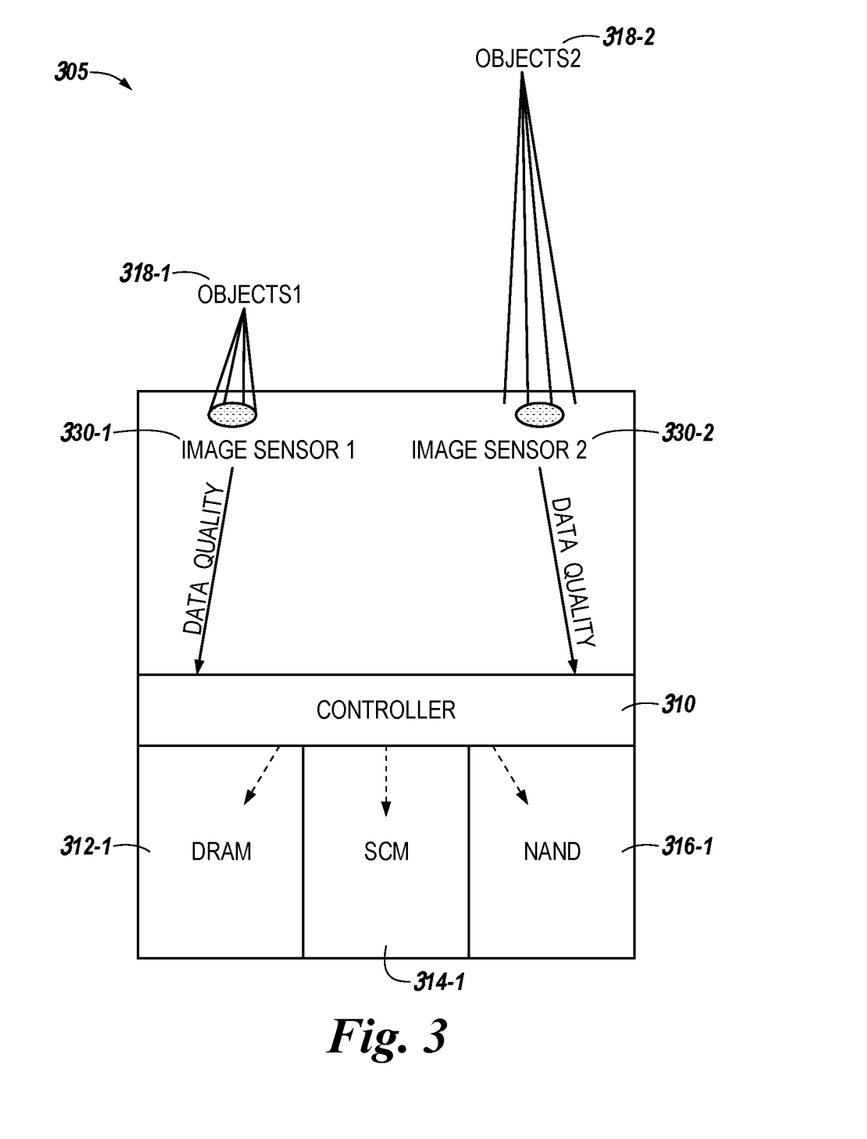
FIG. 3 is a block diagram of a memory system method for media type selection in accordance with a number of embodiments of the present disclosure.

FIG. 3 is a block diagram of a memory system method 305 for media type selection in accordance with a number of embodiments of the present disclosure. The host 302 can include a controller 310 which can be analogous to the controller 110 respectively described in connection with FIG. 1. The controller 310 can be communicatively coupled to image sensors 330-1 and 330-2, which can be generally referred to as the image sensors 330 and be analogous to image sensors 230 described in connection with FIG. 2. While two image sensors (Image sensor1 330-1 and Image sensor2 330-2) are illustrated, embodiments are not so limited, however, and there can be more or less than two image sensors. The controller 310 can be communicatively coupled to multiple memory media types. The memory media types can include a DRAM 312-1, a SCM 314-1, and a NAND 316-1. Embodiments are not so limited, however, and memory system can include any number or combination of memory media types (e.g., non-volatile and/or volatile).

An example host may be a mobile device or a digital camera. The image sensor of the multiple of image sensors on the host may be assigned to capture data based on a distance from a data. The image sensor may be assigned based on the distance between the object and the image sensor. The distance may be measured based on a threshold distance predetermined by a user. Object1 318-1 may represent a plurality of data object at a distance below the threshold distance from the image sensors. Object2 318-2 may represent a data at a distance above the threshold distance from the image sensors.

An image sensor may be assigned to capture objects at a distance below the threshold distance while another may be assigned to capture objects at a distance above the threshold distance. Image sensor1 330-1 may be assigned to capture objects at a distance below the threshold distance. As such, as illustrated in FIG. 3, Image sensor1 330-1 may be assigned to capture Object1 318-1, located at a distance below the threshold distance. Image sensor2 330-2 may be assigned to capture objects at a distance above the threshold distance. As such, as illustrated in FIG. 3, Image sensor2 330-2 may be assigned to capture Object2 318-2, located at a distance above the threshold distance.

The captured data may be sent to the controller 310. The controller 310 may receive the data sent by the image sensors 330. The controller 310 may select a portion of data of the sent data based on identified information (e.g. quality and clarity of the data). The controller 310 can selectively determine which memory media type (e.g., memory media DRAM 312-1, SCM, 314-1, and NAND 316-1) is appropriate for the selected data, based at least in part, on attributes of the data, a context of the host, information included in the data, a comparison of the data to baseline data, or a combination thereof. The controller 310 can determine where to send the data. The unselected data may be discarded by the controller 310. The selection of the memory media type can be based in part on a rank assigned to the data by the controller 310. The assigned rank can be based at least in part on the information about the data and/or the one or more attributes within a context of the host.

The controller 310 can compare the received data from the image sensor to reference data stored by a memory media type (e.g., memory media DRAM 312-1, SCM, 314-1, and NAND 316-1). The controller 310 may assign the data to a memory media type based in part on a rank assigned to the data. The rank may be based on the comparison of the selected data and the reference data. The controller 310 can select, based at least in part on one or more attributes, a memory media type of the plurality of memory media types (e.g., memory media DRAM 312-1, SCM, 314-1, and NAND 316-1).

Figure 4:
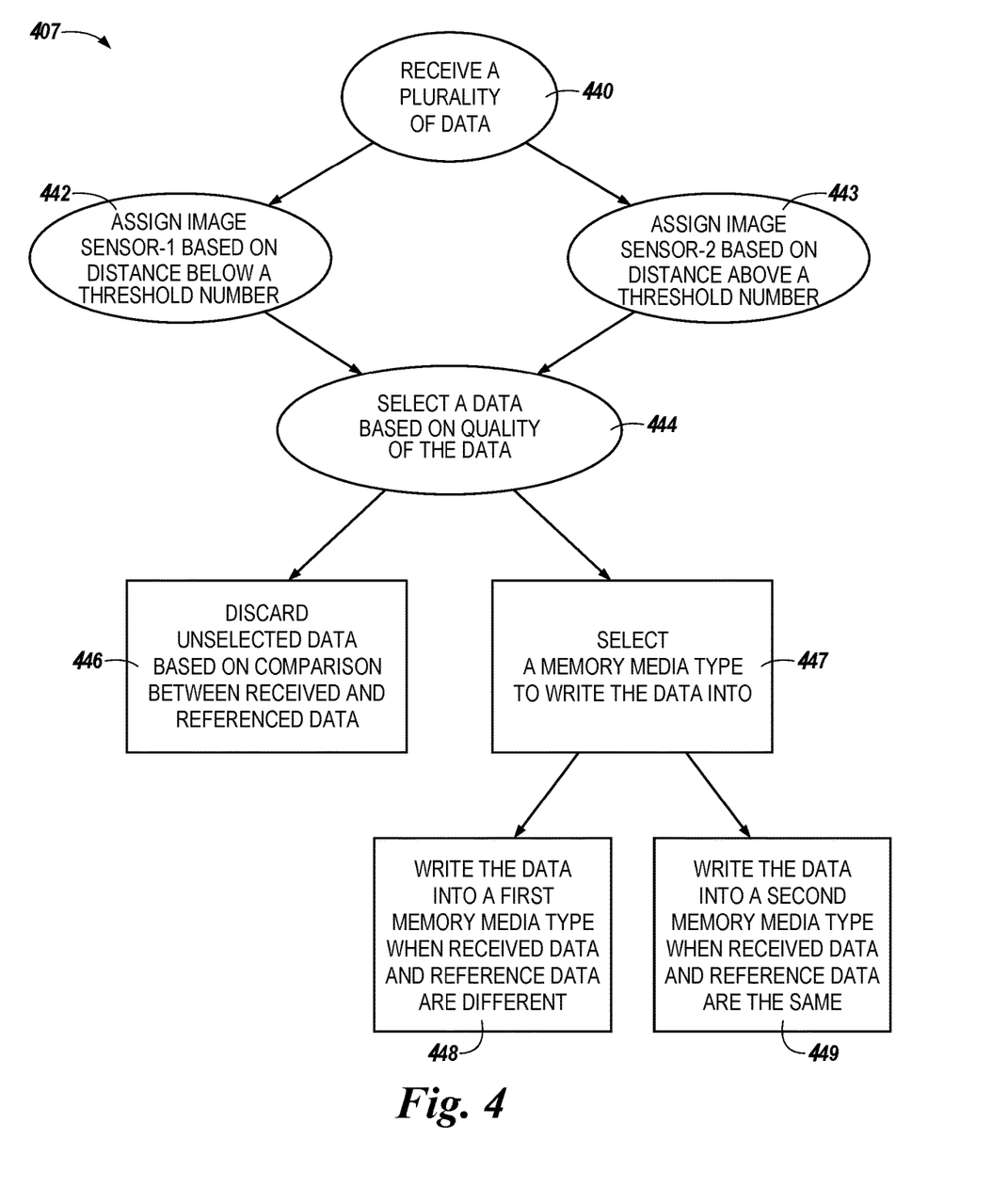
FIG. 4 is a flow diagram of an illustration of a method used by a memory system for media type selection in accordance with a number of embodiments of the present disclosure.

FIG. 4 is a flow diagram of an illustration of a method 407 used by a memory system for media type selection in accordance with a number of embodiments of the present disclosure. At block 440, the method 407 may include receiving data. The data received by the controller (e.g., the controller 110 described in connection with FIG. 1) may be a plurality of images.

At block 442, the method 407 may include assigning an image sensor (e.g. image sensor 230-1 of FIG. 2) of the plurality of image sensors (e.g. image sensors 230 of FIG. 2) to capture data based on a distance below a threshold number. The data may be images of an object. The threshold distance may be predetermined by a user. Data may be assigned to an image sensor based on the threshold distance. The host controller (e.g. host controller 109 from FIG. 1) may compare the distance of the object to assigned to the predetermined threshold distance. Distances below the predetermined threshold distance may be assigned to a consistent image sensor of the plurality of image sensors.

At block 443, the method 407 may include assigning an image sensor (e.g. image sensor 230-2 of FIG. 2) of the plurality of image sensors (e.g. image sensors 230 of FIG. 2) to capture data based on a distance above a threshold number. The data may be images of an object. The threshold distance may be predetermined by a user. Data may be assigned to an image sensor based on the threshold distance. The host controller (e.g. host controller 109 from FIG. 1) may compare the distance of the object to assigned to the predetermined threshold distance. Distances above the predetermined threshold distance may be assigned to a consistent image sensor of the plurality of image sensors. The image sensor assigned for data at a distance below the threshold distance may be different from the image sensor assigned for data at a distance above the threshold distance.

At block 444, the method 407 may include selecting a portion of data based on identified information. Identified information refers to the quality of the data. The controller (e.g., the controller 110 described in connection with FIG. 1) can select a portion of data from the received data based on one or more characteristics of the data that indicate a quality of an image or images represented by the portion of data. The selected data may search for which memory media type (e.g., memory media DRAM 112, SCM, 114, and NAND 116) may be appropriate for the incoming data.

At block 446, the method 407 may include discarding unselected data based on a comparison between received data and referenced data. The controller (e.g., controller 110 of FIG. 1) can compare the received data from the image sensor to reference data (corresponding to the same image sensor) stored by a memory media type (e.g., memory media DRAM 112, SCM, 114, and NAND 116). The controller may assign the data to a memory media type based in part on a rank assigned to the data. The assigned rank can be based at least in part on the information about the data and/or the one or more attributes within a context of the host. Data having better clarity or below a threshold number may be ranked higher than bulky data or unreadable, unclear data. Lower ranked data may be discarded and not stored if the controller determines that the data is sufficiently irrelevant. The controller may determine relevance based on predetermined preferences supplied by a user.

At block 447, the method 407 may include selecting a memory media type (e.g., memory media DRAM 112, SCM 114, and NAND 116) to write the data into. The controller (e.g., controller 110 of FIG. 1) can compare the received data from the image sensor to reference data (corresponding to the same image sensor) stored by a memory media type (e.g., memory media DRAM 112, SCM 114, and NAND 116). The controller may assign the data to a memory media type based in part on a rank assigned to the data. The assigned rank can be based at least in part on the information about the data and/or the one or more attributes within a context of the host. The controller can select, based at least in part on the identified information about the one or more attributes, a memory media type of the plurality of memory media types (e.g., memory media DRAM 112, SCM 114, and NAND 116).

At block 448, the method 407 may include writing the data into a memory media type (e.g., memory media DRAM 112, SCM 114, and NAND 116) when the received data and reference data are different. The controller (e.g., controller 110 of FIG. 1) can identify differences between the received data and the reference data and assign a rank to the received data based at least in part on the identified differences. An indication of differences in the received data and the reference data can indicate that the received data should be stored in a memory media type that is quickly accessible (e.g., DRAM 112).

At block 449, the method 407 may include writing the data into a memory media type (e.g., memory media DRAM 112, SCM 114, and NAND 116) when the received data and reference data are the same. The controller (e.g., controller 110 of FIG. 1) can identify differences between the received data and the reference data and assign a rank to the received data. When no differences between the received data and the reference data are identified, the controller may store the received data in a memory type that is not as quickly accessible (e.g., SCM 114 or NAND 116).

Figure 5:
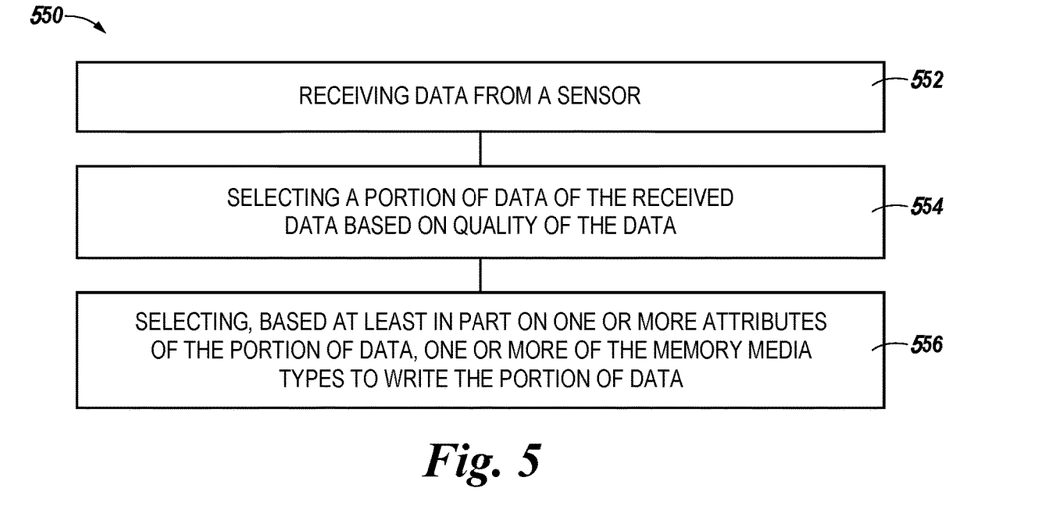
FIG. 5 is a flow diagram representing an example method for media type selection in accordance with a number of embodiments of the present disclosure.

FIG. 5 is a flow diagram representing an example method 550 for media type selection in accordance with a number of embodiments of the present disclosure. At block 552, the method 550 can include receiving data from an image sensor (e.g., image sensors 230 described in connection with FIG. 2). The image sensor may receive data based on the distance between the data source and the host (e.g., host 102 in FIG. 1). An image sensor may receive data based on being above or below a threshold distance. The threshold distance may be predetermined by a user. The host controller (e.g. host controller 109 from FIG. 1) may compare the distance of the data source to the image sensor and the predetermined threshold distance. Distances above the predetermined threshold distance may be assigned to a consistent image sensor of the plurality of image sensors. Distances below the predetermined threshold distance may be assigned to a consistent image sensor of the plurality of image sensors. The image sensor assigned for data at a distance below the threshold distance may be different from the image sensor assigned for data at a distance above the threshold distance.

At block 554, the method 550 can include selecting a portion of data of the received data based on identified information including one or more characteristics of the data that indicate a quality of an image or images represented by the data. Identified information may be based on the quality or clarity of the data. A portion of data may be selected from the received data based on quality or clarity. The selected portion of data may then determine a memory media type to be written into. Unselected portions of data may be discarded.

At block 556, the method 550 can include selecting, based at least in part on the one or more attributes of the data, one or more of the memory media types (e.g., DRAM 112, SCM 114, and/or NAND 116 described in connection with FIG. 1), to write the data. For example, an attribute of data can refer to metrics of the data. An attribute of data can refer to the quantity (e.g. size and number) and quality (e.g. clarity) of the data to be stored in the memory media. In other words, an attribute of the data can refer to a characteristic of the data (e.g., how large the portion of data maybe or how many files exist within the portion of data a location on the host or positional information). The method can include managing a memory access operation to one or more of the memory media types based on the selected portion of data according to the one or more characteristics. The selection of a memory media type from a plurality of memory media types, of which to store the data received, can be made by a memory system controller (e.g., the controller 110 and/or a host controller 109 described in connection with FIG. 1). The controller can rank the data as described herein in connection with FIGS. 1-5 and select a memory device to store the data based on the determined rank.

Figure 6:
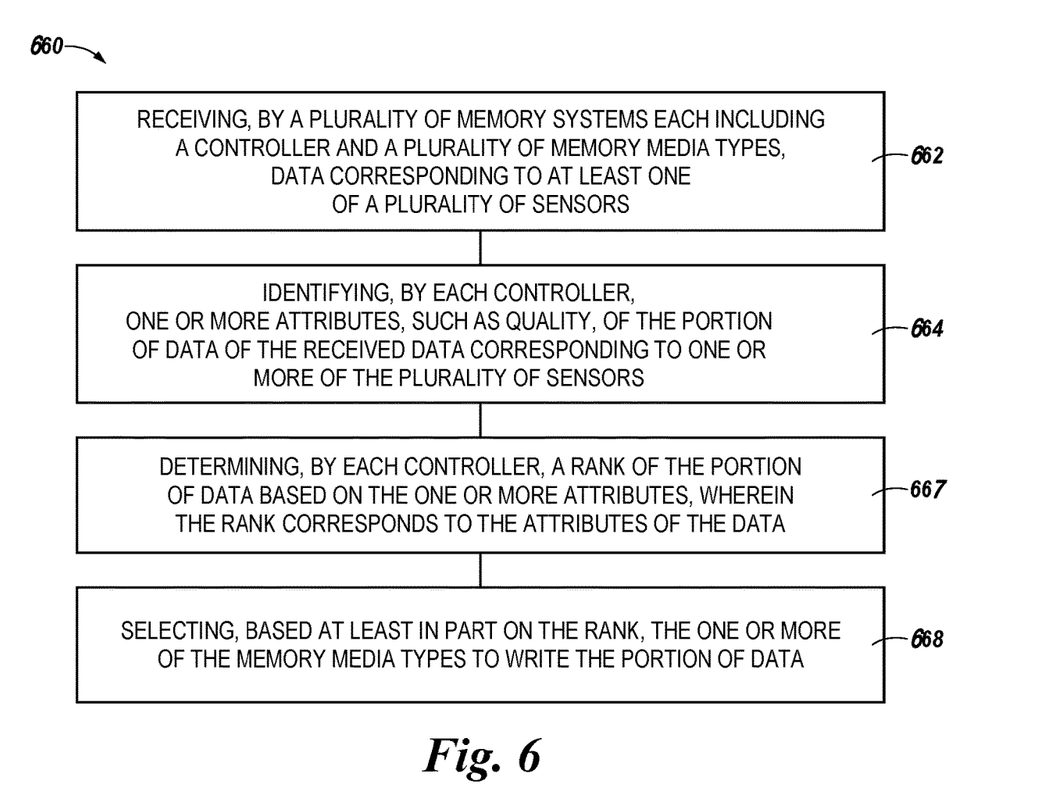
FIG. 6 is a flow diagram representing another example method for media type selection in accordance with a number of embodiments of the present disclosure.

FIG. 6 is a flow diagram representing another example method 660 for media type selection in accordance with a number of embodiments of the present disclosure. At block 662, the method 660 can include receiving, by a plurality of memory systems each including a controller (e.g., the controller 110 described in connection with FIG. 1) and a plurality of memory media types (e.g., DRAM 112, SCM 114, and/or NAND 116 described in connection with FIG. 1), data corresponding to at least one of a plurality of image sensors (e.g., the image sensors 230 described in connection with FIG. 2).

At block 664, the method 660 can include identifying, by each controller, one or more attributes of the portion of data of the received data corresponding to one or more of the plurality of image sensors. For example, an attribute of data can refer to a device (e.g., image sensor) or a type of device (e.g., a camera) that generated the data to be stored in the memory media. In other words, an attribute of the data can refer to a characteristic of the device (e.g., image sensor) that generated the data (e.g., a location on the host or positional information).

At block 667, the method 660 can include determining, by each controller, a rank of the portion of data based on the one or more attributes, wherein the rank corresponds to the attributes of the data. For example, a rank can be assigned to the data based on the attributes of the image sensor that generated the data, and the data can be stored in a memory media type based on the rank of the data. Data requiring quick decisions may be ranked higher and written to a memory media including quick retrieval features (e.g., DRAM). In contrast, data received from an image sensor that is determined not to require a quick decision can be ranked lower and stored in a memory media having a slower retrieval speed (e.g., NAND).

At block 668, the method 660 can include selecting, based at least in part on the rank, the one or more of the memory media types to write the portions of data. The controller can selectively determine which memory media type is appropriate for the incoming data, based at least in part, on attributes of the data, a context of the host, information included in the data, a comparison of the data to baseline data, or a combination thereof. In some embodiments, the ranking of data can be dependent, at least in part on the context (e.g., the operation) of the host as determined by the operation of the memory systems.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method, comprising:
receiving, by a memory system of a mobile device that comprises a plurality of memory media types, data from an assigned image sensor of a plurality of image sensors of the mobile device;

selecting a portion of data from the received data based on one or more attributes of the data that indicate a quality of an image or images represented by the portion of data;

comparing the selected portion of data to reference data stored in the plurality of memory media types;

identifying differences between the selected portion of data and the reference data;

assigning a rank to the selected portion of data based at least in part on the one or more attributes of the data; and managing a memory access operation to one or more of the memory media types based on the ranked portion of data according to the one or more attributes.

2. The method of claim 1, further comprising:

identifying one or more attributes of the portion of data; and selecting, based at least in part on the one or more attributes of the data, one or more of the plurality of memory media types to store the portion of data.

3. The method of claim 1, further comprising:

comparing the data from the assigned image sensor;

selecting at least one portion of data based on information for the quality of the data;

presenting the selected portion of data; and discarding an unselected data.

4. The method of claim 1, further comprising discarding unselected data based on the assigned rank and the operation of the plurality of memory systems.

5. The method of claim 1, further comprising:

writing the selected portion of data in a first memory media type of the plurality of memory media types responsive to the comparison indicating differences between the selected portion of data and reference data; and writing the selected portion of data in a second memory media type of the plurality of memory media types responsive to the comparison indicating that the selected portion of data and the reference data is the same, wherein the first memory media type is volatile, and the second memory media type is non-volatile.

6. The method of claim 1, comprising:

determining, based on identified information about one or more attributes from a first image sensor and a second image sensor, a rank of the information corresponding to the first image sensor and the second image sensor; and selecting a memory media type of the plurality of memory media types to write the data from the first image sensor and the data from the second image sensor, wherein the memory media type selected depends on the determined rank of the information corresponding to the first image sensor and the second image sensor.

7. The method of claim 1, comprising:

determining, based on identified information about one or more attributes of a first portion of the data and a subsequent portion of the data received from the assigned image sensor, a rank of the first portion of the data and the subsequent portion of the data; and selecting a memory media type of the plurality of memory media types to write the first portion of the data and the subsequent portion of the data from the assigned image sensor, wherein the memory media type selected depends on the determined rank of the information corresponding to the first portion of the data and the subsequent portion of the data.

8. The method of claim 7, comprising:

determining information about the one or more attributes of the plurality of data, wherein the attributes are related to a function of the at least one of the plurality of image sensors and the information is related to an image included in the data; and determining a rank of the data based at least in part on the image and the function of the assigned image sensor.

9. The method of claim 1, comprising:

selecting a first memory media type to write a first portion of the data received from the at least one of the plurality of image sensors; and selecting a second memory media type to write a subsequent portion of the data received from the assigned image sensor, wherein the first memory media type and the second memory media type are different and selected based on a determined rank of the first and the subsequent portions of the data.

10. The method of claim 1, comprising:

determining, by a controller, a first operation of a plurality of memory systems;

receiving an initial portion of the data from the assigned image sensor during the first operation of the plurality of memory systems;

assigning an initial rank corresponding to the initial portion of the data, wherein the initial rank is assigned based on the first operation of the plurality of memory systems and attributes of the initial portion of the data; and selecting a first memory media type to write the initial portion of the data based on the assigned initial rank.

11. The method of claim 10, comprising:

determining, by each controller, a subsequent operation of the plurality of memory systems;

updating the initial rank corresponding to an initial portion of the data, wherein the updated rank is assigned based on the subsequent operation of the plurality of memory systems and attributes of the initial portion of the data; and transferring the initial portion of the data to a second memory media type based on the updated rank and the subsequent operation of the plurality of memory systems.

12. An apparatus, comprising:

a plurality of memory media types; and a controller coupled to the plurality of memory media types, wherein the controller is configured to:

receive data from an image sensor of a plurality of image sensors of a mobile device;

identify information about the received data;

select at least one portion of data of the received data based on one or more attributes of the data that indicate a quality of an image or images represented by the portion of data;

compare the selected portion of data to reference data stored in the plurality of memory media types;

identify differences between the selected portion of data and the reference data;

assign a rank to the selected portion of data based at least in part on the one or more attributes of the data; and manage a memory access operation to one or more of the memory media types based for the ranked portion of data according to the one or more attributes.

13. The apparatus of claim 12, wherein a user may override the selected portion of data.

14. The apparatus of claim 12, wherein the plurality of image sensors includes a plurality of lens.

15. The apparatus of claim 12, wherein the image sensor is communicatively coupled to a host.

16. A system, comprising:
   a plurality of image sensors of a mobile device to detect an object; and
   one or more memory systems, each communicatively coupled to the plurality of image sensors, wherein each of the one or more memory systems comprises a controller coupled to a plurality of memory media types, each of the controllers configured to:
      receive data from an image sensor of the plurality of image sensors of the mobile device;
      identify information about the received data based on one or more attributes of the data that indicate a quality of an image or images represented by a portion of data;
      compare one or more attributes of the received data to reference data corresponding to the plurality of image sensors;
      select, based on the comparison of received data and the reference data, a memory media type of the plurality of memory media types;
      compare the selected portion of data to reference data stored in the plurality of memory media types;
      identify differences between the selected portion of data and the reference data;
      assign a rank to the selected data based at least in part on the comparison of the received data and the reference data; and
      write the ranked portion of data into the selected memory media type.

17. The system of claim 16, wherein:
   the plurality of image sensors includes a plurality of lens on a camera designated based on distance.

18. The system of claim 16, wherein the memory media type selected is volatile memory responsive to the determination by the controller that the reference data and the received data are different.

19. The system of claim 18, wherein the memory media type selected is non-volatile responsive to the determination by the controller that the reference data and the received data are the same.

* * * * *